US009361669B2

(12) United States Patent  
Murasawa et al.

(10) Patent No.: US 9,361,669 B2  
(45) Date of Patent: Jun. 7, 2016

(54) IMAGE PROCESSING APPARATUS, IMAGE PROCESSING METHOD, AND PROGRAM FOR PERFORMING A BLURRING PROCESS ON AN IMAGE

(75) Inventors: Kouta Murasawa, Yokohama (JP); Kiyoshi Umeda, Kawasaki (JP); Shinjiro Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/553,548

(22) Filed: Jul. 19, 2012

(65) Prior Publication Data

US 2013/0021498 A1  Jan. 24, 2013

(30) Foreign Application Priority Data

Jul. 23, 2011 (JP) ................................. 2011-161443

(51) Int. Cl.
*H04N 5/228* (2006.01)  
*G06T 5/00* (2006.01)  
*H04N 5/14* (2006.01)

(52) U.S. Cl.
CPC ............... *G06T 5/002* (2013.01); *H04N 5/142* (2013.01); *G06T 2207/10024* (2013.01)

(58) Field of Classification Search
CPC ..... H04N 5/142; H04N 5/00; H04N 21/4825; H04N 21/8352; G06T 5/002; G06T 2207/10024  
USPC .......................... 348/234, 222.1; 382/274, 167  
See application file for complete search history.

(56) References Cited

U.S. PATENT DOCUMENTS

| 6,501,822 | B2 | 12/2002 | Roder | |
|---|---|---|---|---|
| 7,489,345 | B2 | 2/2009 | Fukumoto | |
| 7,764,319 | B2 | 7/2010 | Fukumoto | |
| 8,885,971 | B2 * | 11/2014 | Hori et al. | 382/274 |
| 2003/0142850 | A1 * | 7/2003 | Eggers et al. | 382/104 |
| 2011/0032581 | A1 * | 2/2011 | Ikeda | 358/463 |
| 2012/0219228 | A1 * | 8/2012 | Osako et al. | 382/199 |
| 2013/0022290 | A1 * | 1/2013 | Hori et al. | 382/274 |

FOREIGN PATENT DOCUMENTS

| JP | 2003-284060 | A |   | 10/2003 |
|---|---|---|---|---|
| JP | 2009-003858 | A |   | 1/2009 |
| JP | 2009003858 | A | * | 1/2009 |
| JP | 2009-218704 | A |   | 9/2009 |
| JP | 2009218704 | A | * | 9/2009 |
| JP | 2010-251999 | A |   | 11/2010 |
| JP | 2010-273144 | A |   | 12/2010 |
| JP | 2011-10162 | A |   | 1/2011 |

OTHER PUBLICATIONS

U.S. Appl. No. 13/553,589, filed Jul. 19, 2012, Shinjiro Hori.

* cited by examiner

*Primary Examiner* — Antoinette Spinks  
(74) *Attorney, Agent, or Firm* — Canon USA, Inc. IP Division

(57) ABSTRACT

A blurring process is performed on an addition area including a point light source area detected in an image to be processed so that the nearer to the circumference of the addition area, the higher the luminance value while an addition coefficient is being increased according to a distance from the center.

19 Claims, 18 Drawing Sheets

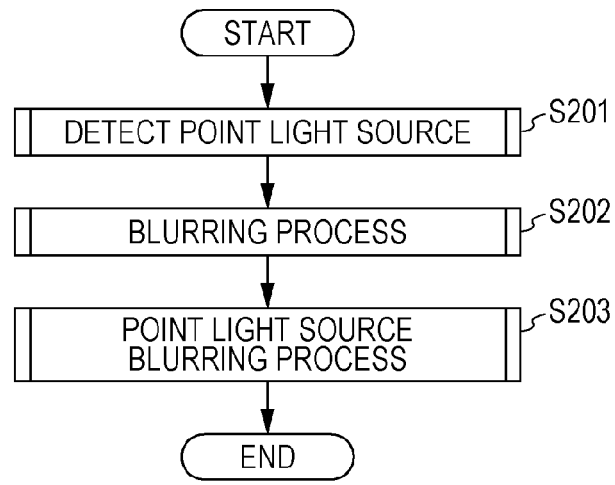
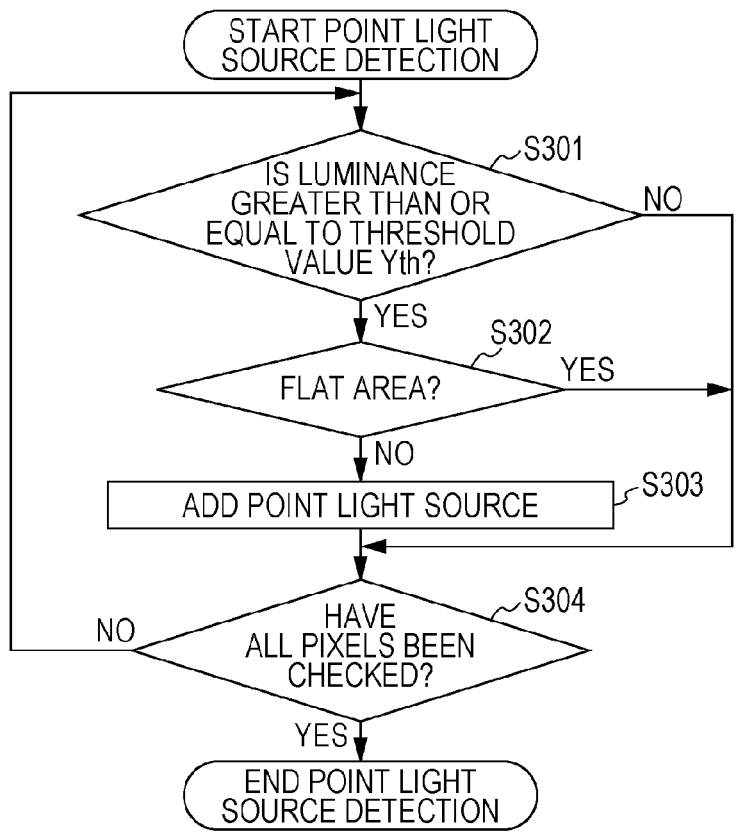

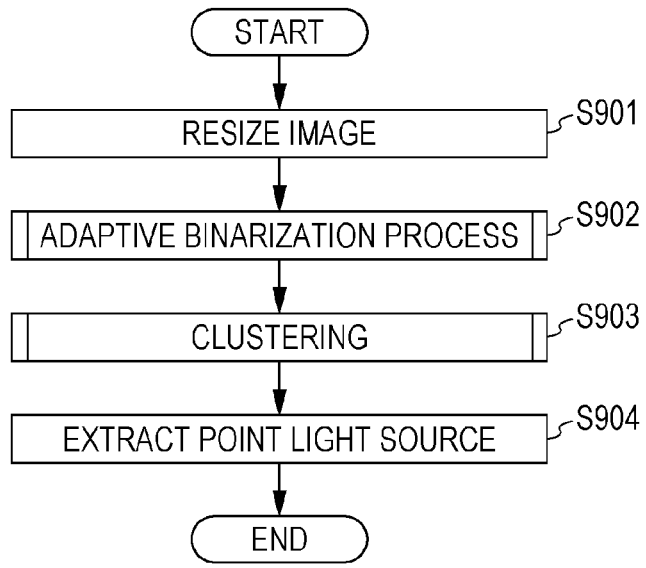
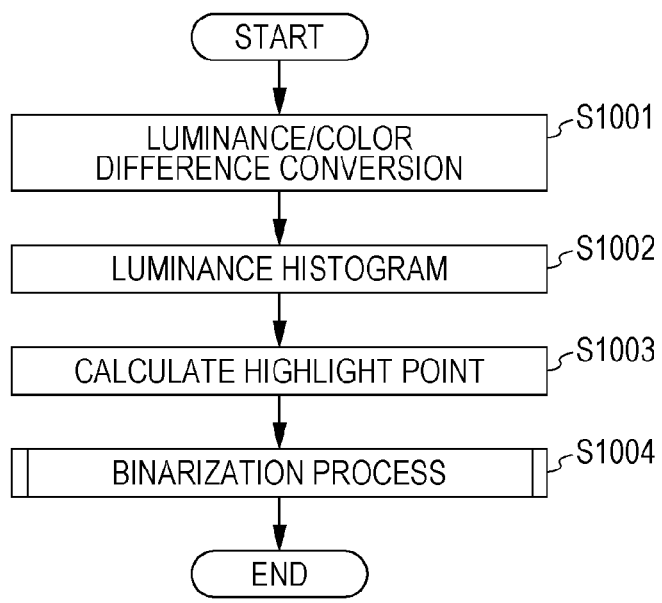

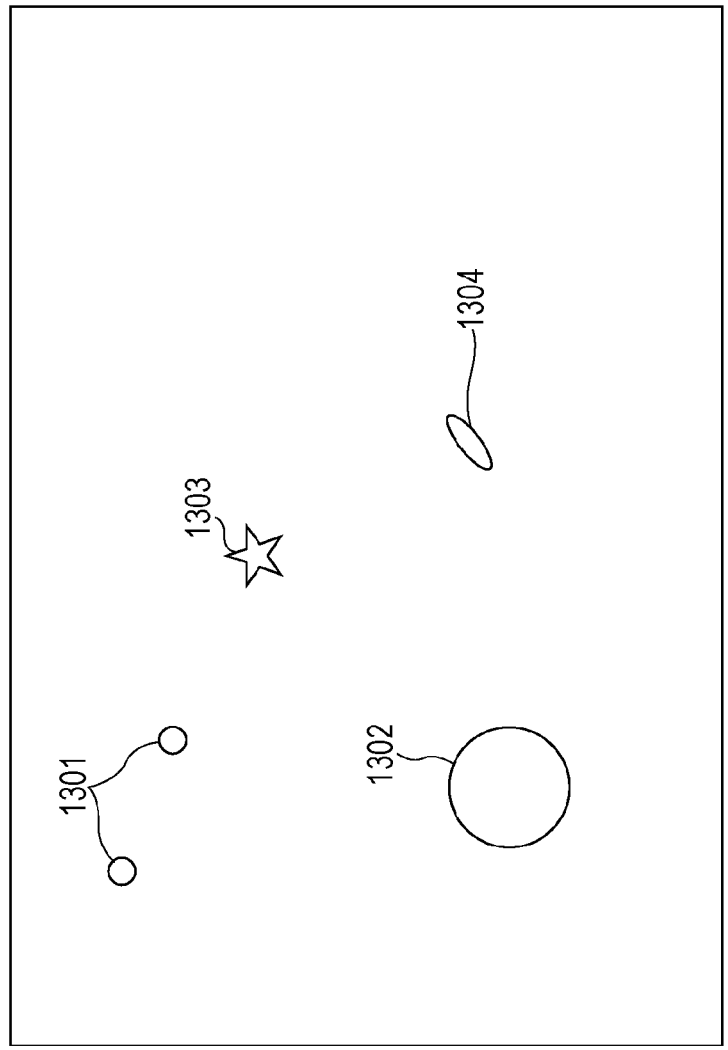

| AREA ID | AREA COORDINATES | | | | AREA CENTER POSITION | | PERIMETER |
|---|---|---|---|---|---|---|---|
| 0 | Xmin0 | Xmax0 | Ymin0 | Ymax0 | Cx0 | Cy0 | Larr0 |
| 1 | Xmin1 | Xmax1 | Ymin1 | Ymax1 | Cx1 | Cy1 | Larr1 |
| ⋮ | ⋮ | ⋮ | ⋮ | ⋮ | ⋮ | ⋮ | ⋮ |

FIG. 18A
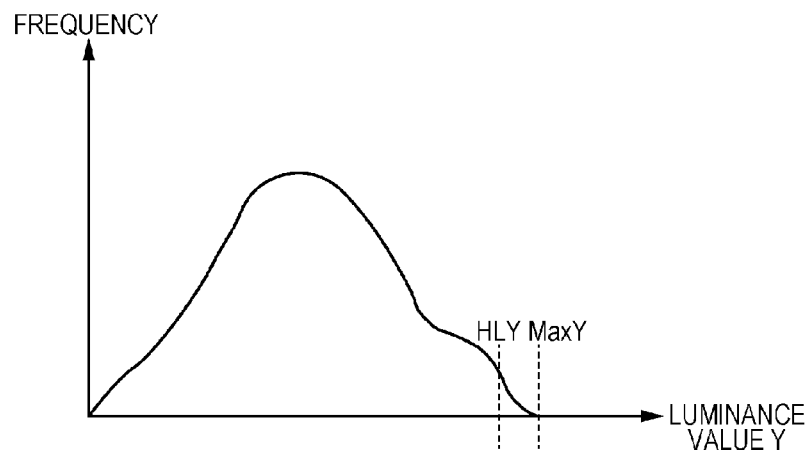
FIG. 18B
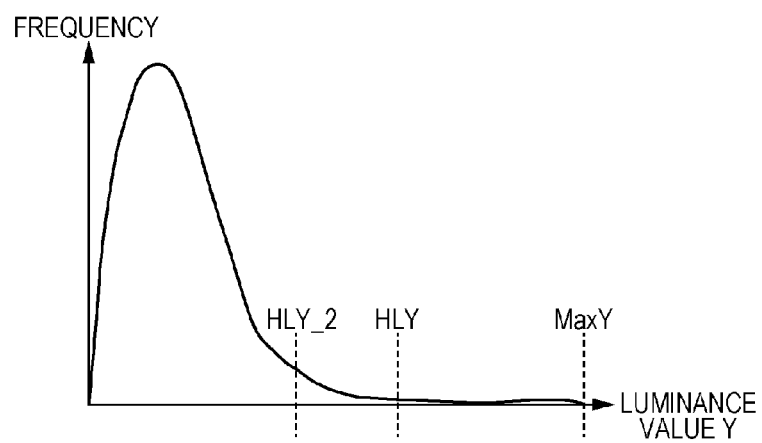
FIG. 18C
| IMAGE CAPTURING SCENE | WEIGHT W |
|---|---|
| LANDSCAPE | 1.0 |
| NIGHTSCAPE | 0.8 |
| UNDEREXPOSURE | 0.6 |

IMAGE PROCESSING APPARATUS, IMAGE PROCESSING METHOD, AND PROGRAM FOR PERFORMING A BLURRING PROCESS ON AN IMAGE

BACKGROUND OF THE INVENTION

1. Field of the Invention

The present invention relates to an image processing apparatus, an image processing method, and a program for performing a predetermined process on an inputted image.

2. Description of the Related Art

Conventionally, an image capturing method is known in which a main object is focused and the background is blurred when capturing an image by a digital camera. In such an image capturing method, a point light source is blurred, so that a ball blur is generated at a portion corresponding to the point light source and an image with a fantastic effect can be obtained. Such a ball blur is generated by the optical characteristics of a lens of the digital camera and the brightness varies in a ball-shaped blurring image. The point light source is an area having a certain size at which local light is present. Bokeh is a term of art commonly used to describe the aesthetic quality of a blur in out of focus areas of images.

A method is known in which image data is obtained and the image data is processed into an image where a ball blur is generated by image processing (see Japanese Patent Laid-Open No. 2009-003858 and Japanese Patent Laid-Open No. 2009-218704).

Japanese Patent Laid-Open No. 2009-003858 discloses a method for changing the size or the shape of a light source area when blurring the light source area by selecting one of a plurality of filters prepared in advance for the light source area in an image. Japanese Patent Laid-Open No. 2009-218704 discloses a method for performing image enhancement processing on a high luminance portion when performing a background blurring process.

A ball blur portion in an image actually captured by a digital camera varies in a complicated manner by the optical characteristics of a lens. Therefore, it is not possible for the methods disclosed by the Japanese Patent Laid-Open No. 2009-003858 and Japanese Patent Laid-Open No. 2009-218704 to reproduce the feeling of an image obtained by actual image capturing.

SUMMARY OF THE INVENTION

The present invention is made in view of the above problem and the present invention provides an image processing apparatus, an image processing method, and a program capable of obtaining a blur image, which is obtained by capturing an image using a lens, by processing image data.

In order to solve the above problem, the image processing apparatus of the present invention includes an input unit configured to input image data, a detecting unit configured to detect an area corresponding to local light in an image represented by the image data inputted by the input unit, and a processing unit configured to perform a blurring process on the area corresponding to local light and detected by the detecting unit. The processing unit performs the blurring process so that an image of a surrounding portion of the area corresponding to local light is brighter than that of a central portion of the area.

According to the present invention, it is possible to obtain a blur image, which is obtained by capturing an image using a lens, by processing image data.

Further features of the present invention will become apparent from the following description of exemplary embodiments with reference to the attached drawings.

BRIEF DESCRIPTION OF THE DRAWINGS

FIG. 2 is a flowchart showing a process of an embodiment.

FIG. 3 is a flowchart showing point light source detection.

FIG. 9 is a flowchart showing a process of point light source detection.

FIG. 10 is a flowchart showing an adaptive binarization process.

FIG. 13 is a diagram showing an area group of point light source candidates in an image to be processed.

FIGS. 18A to 18C are diagrams for explaining a weight according to an image capturing scene.

DESCRIPTION OF THE EMBODIMENTS

Hereinafter, embodiments of the present invention will be described with reference to the drawings. The embodiments are only examples and the present invention is not limited to the embodiments described below. The point light source mentioned below includes an image corresponding to a light having a certain size, so that the point light source is also referred to as local light.

First Embodiment

Figure 1:
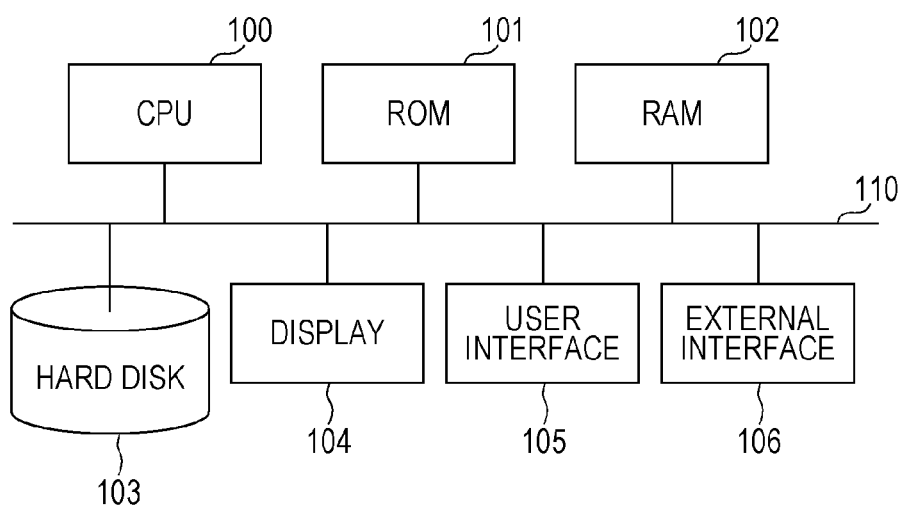
FIG. 1 is a block diagram showing a configuration of an image processing apparatus of an embodiment.

FIG. 1 is a block diagram showing a hardware configuration example of an image processing apparatus of an embodiment. The image processing apparatus can be realized by, for example, installing predetermined software in a general-purpose personal computer (PC). In FIG. 1, a CPU (Central Processing Unit) 100 controls the image processing apparatus according to programs corresponding to processes shown in flowcharts described below. A ROM 101 stores the program executed by the CPU 100. A RAM 102 temporarily stores various information when the CPU 100 executes the program and also stores setting information related to processing of the image processing apparatus. A hard disk (HD) 103 is a non-transitory storage medium for storing image data (image file) to be processed and parameters used to identify a pattern. The HD 103 also stores programs corresponding to processes shown in flowcharts described below. A display 104 displays information to be displayed for the user. A user interface (UI) 105 receives an operation performed by a user. The UI 105 includes a keyboard and a pointing device such as a mouse. An external interface (IF) is an interface to connect external apparatuses to the image processing apparatus. Examples of the external apparatuses include an image scanner that reads an image on a document, a memory device that can store image data, and a digital camera that can capture images. The image processing apparatus can acquire image data to be processed via the external IF 106. A control bus/data bus 110 connects the components described above with the CPU 100 and enables them to communicate with each other.

Next, a process to perform a blurring process on an image represented by image data inputted in the image processing apparatus shown in FIG. 1 will be described. FIG. 2 is a flowchart showing the blurring process. In the blurring process performed here, the image is processed into an image in which a specific object in the image is focused and objects in the background are blurred. A point light source blurring process, which is suitable to blur a point light source, is performed on portions corresponding to a point light source included in the image. These processes are processes for artificially reproducing the feeling of an image that is actually captured through a lens of a camera. When actually capturing an image using a camera, if it is intended that a main object will be focused and the background will be blurred, an aperture is opened wide and the depth of field is reduced to narrow the range of focused positions. Or, the same effect can be obtained by using a telephoto lens or a macro lens. In this case, although a ball blur occurs around a point light source, in an area of the ball blur, the luminance of the surrounding portion is higher than that of the central portion of the area. In the process described below, an image in which the background is blurred by the image capturing method as described above is reproduced by processing image data. The process described below is performed by loading a program stored in the ROM 101 or the HD 103 to the RAM 102 and executing the program by the CPU 100. The image data to be processed is obtained into the image processing apparatus through the external IF 106 and stored in the HD 103. Then, a user specifies the image data using the UI 105 and instructs the image processing apparatus to perform the blurring process, so that the process shown in FIG. 2 is started. The image data to be processed is, for example, image data captured by a digital camera or a digital video recorder or image data obtained by reading an image captured by an analog camera by a scanner. As the image data to be processed, it is possible to use image data obtained by various methods other than the above methods, such as image data created by an image processing application. When the image represented by the image data to be processed includes at least one area corresponding to a point light source (not limited to a circle) and a ball blur does not occur around the area or a large ball blur does not occur around the area, a sufficient effect can be obtained by the process described below.

First, in S201, an area corresponding to a point light source is detected from the inputted image data. The image data to be processed is an entire area of the image (angle of view) represented by the inputted image data, an area specified by the user in the image, or the like. If the image data to be processed is printed out, the image data to be processed may be an area to be printed out. Next, in S202, the blurring process is performed on the inputted image data. The blurring process performed at this time uses a method for smoothing the image data. Specifically, a low pass filter process such as a mean filter and a Gaussian filter, a process for converting the image data into a spatial frequency domain and eliminating high-frequency components, and a process for reducing the image and then enlarging the image are used. At this time, the blurring process is performed on the background area other than the point light source detected in S201 and a main object. When detecting the background area, an object located at the center is automatically detected as the main object or an object specified by the user via the UI 105 is extracted as the main object, and the remaining area is handled as the background area. In S202, the blurring process is performed on an area obtained by removing the area detected as a point light source from the background area.

Next, in S203, the point light source blurring process is performed on the point light source area detected in S201. The point light source here is a light image having a certain size and having a luminance higher than that of areas surrounding the point light source. If the point light source area cannot be detected in S201, the process of S203 is omitted.

Next, the details of S201 will be described with reference to FIG. 3. In the point light source detecting process, an isolated light source area is detected from the image data to be processed. First, in order to detect a light source, a predetermined luminance threshold value Yth is determined. Here, as an example, the luminance threshold value Yth is a predetermined constant threshold value. A target pixel is sequentially specified from the image data to be processed and the process shown in FIG. 3 is sequentially performed.

In S301, it is determined whether or not the luminance of the target pixel is greater than or equal to the luminance threshold value Yth. If it is determined that the luminance of the target pixel is greater than or equal to the luminance threshold value Yth, in step S302, it is determined whether or not the target pixel is included in a flat area.

In S302, an area which is constituted by a pixel group of a point light source candidate including the target pixel and whose size is smaller than or equal to a predetermined size and whose luminance is greater than that of the surrounding pixels by a certain value are detected as a point light source area, and the other area is determined to be a flat area (area other than a point light source). Here, it is assumed that the point light source area desired to be detected has a shape of circle, the radius of the point light source area desired to be detected is R, and the difference of luminance from that of the surrounding areas is Ydiff, and the values of these are determined. In this case, in S302, first, a luminance value Yorg of the target pixel and luminance values Yn (n is a value from 1 to 8) of pixels that are apart from the target pixel in eight directions (up, down, left, right, and four oblique directions) by the radius R are obtained. The positions of the pixels to be compared with the target pixel may be determined in advance according to the value of the radius R and the number of the pixels to be compared may be changed. When the pixels to be compared are pixels adjacent to the target pixel, the eight pixels in the up, down, left, right, and four oblique directions are determined naturally. In the description here, it is assumed that the number of the pixels to be compared is eight. The luminance differences between the luminance value Yorg and the eight luminance values Yn are calculated respectively. If at least one of the luminance differences is smaller than the luminance difference Ydiff, the target pixel is determined to be in a flat area and if all the luminance differences are greater than or equal to the luminance difference Ydiff, the target pixel is determined not to be in a flat area.

The pixel determined not to be in a flat area in S302 is added to a detection result as a point light source in S303. The above process is performed on all the pixels in the image data to be processed. Although, in the description here, the point light source desired to be detected has a shape of a circle, the point light source may have other shapes such as a polygon. The positions of the surrounding pixels to be compared or the number of the pixels to be compared in S302 may vary according to the shape of the point light source.

In the above process, the image data to be processed may be reduced, and then the above process may be performed on the reduced image data, and thereafter the image data may be enlarged to the original image size. In this case, one pixel that is determined to be a point light source in the reduced image data becomes a plurality of pixels by the enlargement process. The subsequent processes are applied to the above plurality of pixels.

Figure 4:
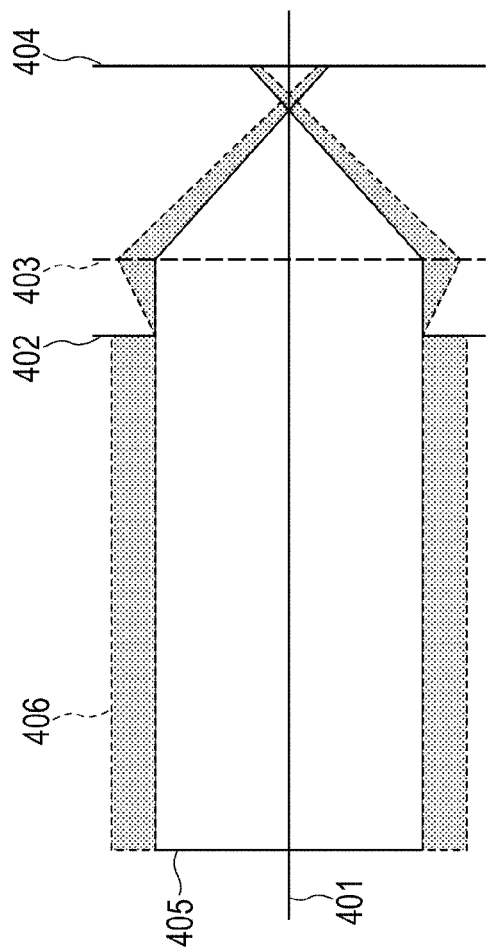
FIG. 4 is a diagram showing a state in which light inputted through a lens forms an image.

Next, the details of S203 will be described. Here, a phenomenon used as a model of the point light source blurring process will be described. FIG. 4 is a diagram for explaining generation of a ball blur of a point light source when an image is actually captured by a digital camera or the like through a lens. In FIG. 4, the digital camera, incident light to the digital camera, and the lens are omitted for simplicity.

In FIG. 4, light 405 enters from left to right and an optical axis 401 is located in the center. The normal light 405 entering the digital camera reaches an imaging plane 404 (image sensor) through a lens 403. Although the lens 403 is assumed to be a spherical lens, the lens 403 is depicted to have a flat surface for simplicity. Here, light corresponding to a point light source (light from the background) is described, so that the imaging plane 404 is not focused (the focal point is in front of the imaging plane 404) (the object is focused).

At this time, light 406 of the light entering the digital camera, which is blocked by the aperture 402 does not normally enter the lens 403. However, some of the light 406 goes around the aperture 402 to the back of the aperture 402 by the diffraction phenomenon and reaches the imaging plane 404 through the lens 403. The diffraction of light is a phenomenon in which the light goes around an obstacle to the back of the obstacle by the wave nature of the light when the light hits the obstacle. In this way, due to the diffraction of light, the image formed on the imaging plane 404 is affected by the light 406 blocked by the aperture 402 in addition to the light 405 passing inside the aperture 402. The light is not focused, so that light converging to one point is diffused and enters the imaging plane 404. Therefore, the influence of the blocked light 406 increases.

The stronger the light entering the camera lens, the stronger the blocked light 406 and the phenomenon described above appears prominently. The blocked light 406 enters the lens 403 as oblique light with respect to the optical axis 401 by the diffraction. Therefore, the focal point of the blocked light 406 is shifted away from the optical axis. Therefore, when the blocked light 406 enters the imaging plane 404, the blocked light 406 is combined with the normal light 405 and forms an image. Therefore, in the ball blur of the point light source, the luminance of the outer portion (surrounding portion) is higher than that of the central portion.

The farther the point light source (background) or the shallower the depth of field, the focal point of the normal light 405 entering the imaging plane is away from the imaging plane 404. Therefore, the size of the blur generated by the light entering the imaging plane 404 increases, and accordingly the luminance decreases. The blocked light 406 enters the imaging plane 404 at an angle different from that of the normal light 405. Therefore, when the focal point is apart from the imaging plane 404, the blocked light 406 is combined with the normal light 405 in a predetermined distance, and as the blocked light 406 approaches the predetermined distance, the blocked light 406 gradually converges to the edge of the normal light 405. Beyond the predetermined distance, the blocked light enters the imaging plane outside the normal light 405, so that the intensity of the blocked light 406 can be ignored.

In this way, the light from the background having brightness higher than a certain level, which enters the camera lens, is diffracted, so that the luminance of the surrounding portion is higher than that of the central portion.

By using the phenomenon, in which the ball blur of the point light source occurs when an image is actually captured through a lens, as a model, image data is processed so that the point light source blurring process can reproduce the phenomenon.

Figure 5A:
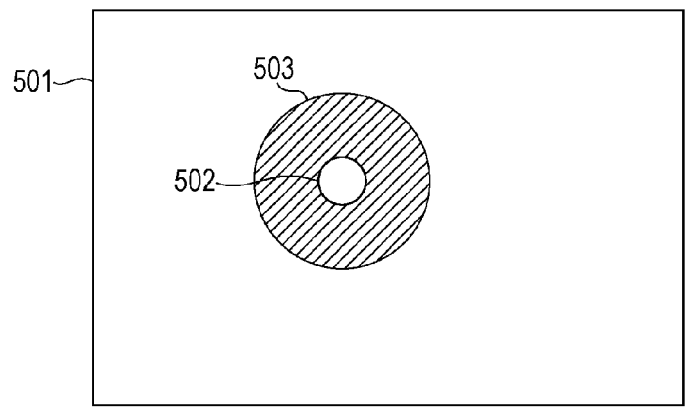
FIGS. 5A to 5C are diagrams for explaining a point light source blurring process.

In FIG. 5A, in an image area 501 to be processed, if a point light source area 502 is the point light source area detected in S201, an addition area 503 is set, which is enlarged from the point light source area 502 to enclose the point light source area 502. Then, the blurring process is performed inside the outer circumference of the addition area 503 (including the point light source area 502) as described below.

First, an additional luminance value to be a reference is calculated on the basis of the average luminance value of the pixels in the point light source area 502 or the luminance value of a pixel corresponding to the center point. Then, the addition area 503 larger than the point light source area 502 is determined from the size and the average luminance value of the point light source area 502 and a blur intensity based on an instruction from the UI 105. The addition area 503 is set as an addition area.

A luminance value obtained by using an addition coefficient determined according to a distance from the center point and the predetermined additional luminance value is added to pixels located inside the addition area 503. When the additional luminance value is Yadd, the addition coefficient is k, the target pixel luminance is Yorg, and an output pixel luminance is Yout, the output pixel luminance can be calculated by the formula below.

$$Yout = (1-k) \times Yorg + k \times Yadd \quad \text{(Formula 1)}$$

At this time, the addition coefficient k is set so that the luminance value of the outer circumference of the ball blur portion is high as described in FIG. 4.

When a range of the output luminance value should be limited to a specific range, the output luminance value may be calculated so that the output luminance value is within an appropriate range by performing clip processing, in which a specific range is set, on the output luminance value.

The additional luminance value Yadd may be changed on the basis of the size of the addition area 503. In this case, a predetermined reference area is determined, and when the area of the addition area 503 is larger than the reference area, the additional luminance value Yadd is decreased, and when the area of the addition area 503 is smaller than the reference area, the additional luminance value Yadd is increased.

Although, in the above description, calculation is performed on the luminance value of each pixel, the above process may be performed on the pixel value of each pixel. By doing so, the blurring process of the point light source can be performed based on not only the luminance values, but also colors of pixels. As an example, a case in which a pixel including color components of three primary colors of red (R), green (G), and blue (B) is calculated (pixel values are changed) will be described below.

Here, additional pixel values to be a reference are calculated on the basis of the average pixel value of the point light source area 502 or the pixel values of the center point. Addition is performed on the pixels inside the addition area 503 using the addition coefficient. When the additional pixel values are Radd, Gadd, and Badd, the addition coefficient is k, target pixel values are Rorg, Gorg, and Borg, and output pixel values are Rout, Gout, and Bout, the output pixel values can be calculated by the formulas below.

$$Rout=(1-k)\times Rorg+k\times Radd \quad \text{(Formula 2)}$$

$$Gout=(1-k)\times Gorg+k\times Gadd \quad \text{(Formula 3)}$$

$$Bout=(1-k)\times Borg+k\times Badd \quad \text{(Formula 4)}$$

When a range of the output pixel values should be limited to a specific range, the output pixel values may be calculated so that the output pixel values are within an appropriate range by performing clip processing, in which a specific range is set, on the output pixel values. The additional pixel values Radd, Gadd, and Badd may be changed on the basis of the size of the addition area 503. In this case, a predetermined reference area is determined, and when the area of the addition area 503 is larger than the reference area, the additional pixel values Radd, Gadd, and Badd are decreased, and when the area of the addition area 503 is smaller than the reference area, the additional pixel values Radd, Gadd, and Badd are increased.

Figure 5B:
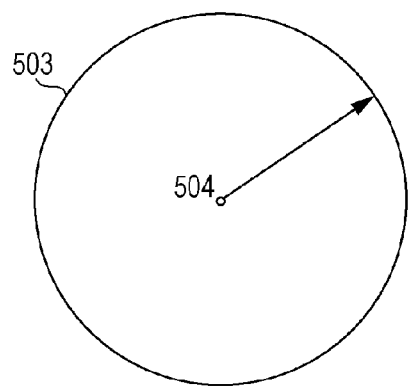
Figure 5C:
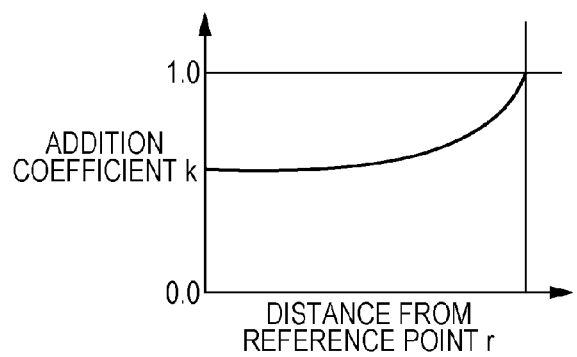

Next, an example of a determination method of the addition coefficient k used in the above calculations will be described with reference to FIGS. 5B and 5C. Here, the addition coefficient k is determined by using a quadratic function described below. Here, the addition coefficient is k, the distance from the center 504 of the point light source is r, the radius from the center 504 to the outer circumference of the addition area 503 is R, and a and b are arbitrary constants. However, k is between 0.0 and 1.0.

$$1.0=a\times R^2+b \quad \text{(Formula 5)}$$

$$1.0\geq b\geq 0.0 \quad \text{(Formula 6)}$$

$$a\geq 0.0 \quad \text{(Formula 7)}$$

The addition coefficient k can be calculated by the formula below using the above as a prerequisite.

$$k=a\times r^2+b \quad \text{(Formula 8)}$$

The addition coefficient k may be changed on the basis of the area of the addition area 503. In this case, the luminance difference between the central portion and the surrounding portion when the addition area 503 is large is set to be larger than when the addition area 503 is small. In this case, a predetermined reference area Sbase is determined and b of the reference area is defined as bbase, the luminance difference can be realized by adding the following formula to the above prerequisite.

$$b=bbase\times S\div Sbase \quad \text{(Formula 9)}$$

At this time, if b is greater than 1.0, clip processing may be performed so that b is 1.0.

The determination method of the addition coefficient may be obtained on the basis of a method other than the above quadratic function. The determination method of the addition coefficient k may be other than the method of the above quadratic function if the determination method has a feature that the addition coefficient near the surrounding portion is higher than that at the center point 504 of the addition area 503 and the addition coefficient increases in the shape of convex downward as shown in FIG. 5C instead of increasing linearly. For example, the addition coefficient may be determined by using a gamma curve which is used to perform gamma correction for display and printing or may be determined by creating a table including calculation results in advance. The addition coefficient has a value based on the characteristics including the diffraction of light described above. Although the addition area is described to have a shape of circle, the addition area may have other shapes such as a polygon. In this case, the radius R of the addition area is a distance from the center point of the addition area to the farthest point from the center point in the addition area. Although the center point of the circle is used as a starting point of the addition coefficient, the starting point may be changed according to the shape of the addition area or the lamination distribution.

The addition areas of a plurality of point light sources may overlap each other depending on the positions of the point light sources and the sizes of the addition areas. In this case, the output pixel values are calculated as described above, the overlapped output pixel values are compared with each other, and the higher value may be outputted as the output pixel value. Or, the average value of the overlapped output pixel values may be outputted as the output pixel value.

As described above, it is possible to more faithfully reproduce the point light source blurring process in the case of capturing an image thorough a lens by changing the luminance values of the image data.

In the above process, pixels that are determined to be a point light source are sequentially detected in S201. At this time, if pixels around a point light source are also point light sources, the point light sources may be handled as one point light source area to be blurred in S203 or each of the detected point light sources may be handled as a separate point light source area to be blurred in S203.

Figure 6:
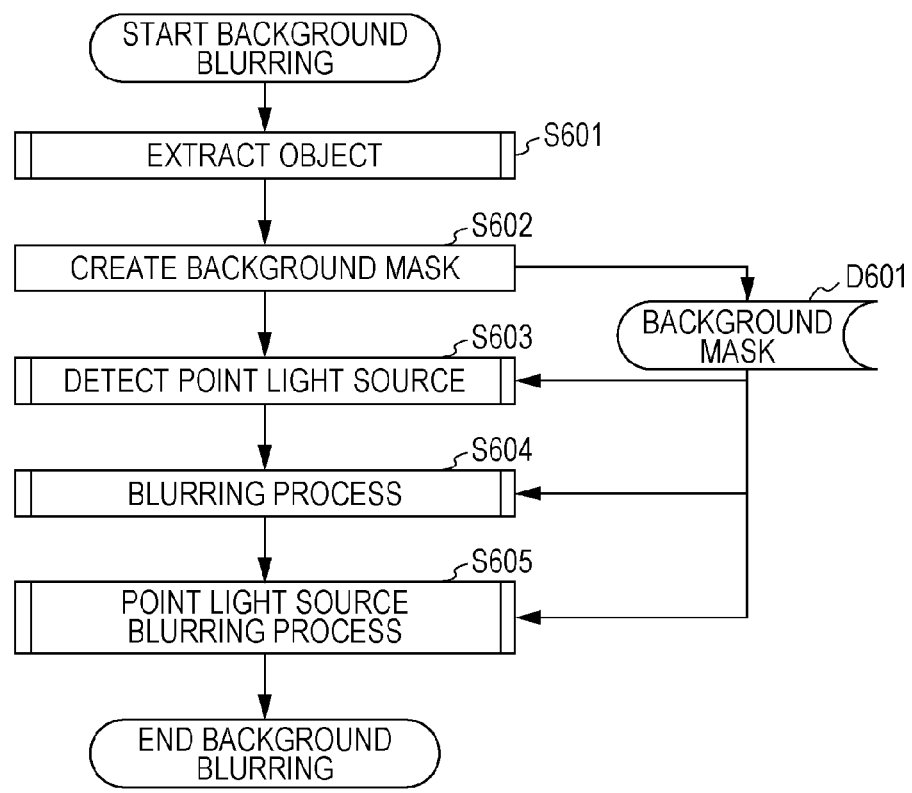
FIG. 6 is a flowchart showing a background blurring process.

When performing the process (background blurring) as described above, a main object has to be focused. In other words, it is necessary not to blur a specific object (the main object). In this case, this can be easily and accurately realized by performing the procedure below as shown in FIG. 6.

In S601, an object (an object to be focused) is extracted from the inputted image data and a main object and the background are separated from each other. The separation method may be a method in which an image to be processed is displayed on the display 104 and a user specifies the area to be separated using the UI 105 or a method in which an object is automatically specified and separated. When automatically separating an object, the object may be specified by using information of image capturing condition such as the depth of field, which is attached to the image data. If the user specifies the area, the user specifies the area before the method of FIG. 6 starts. When specifying the area, it is possible to employ a semi-automatic method in which the user roughly specifies the area and the CPU 100 detects edges of the specified area, so that the CPU determines the final area.

When the main object and the background are separated from each other, a background mask D601 for distinguishing the background and the main object is created. Here, the background mask D601 is data in which the main object extracted in S601 is removed from the image data to be processed (the image data is converted into data without image) and only the background remains. Then, processes of S603 to S605 are performed on the background mask D601. In S603 to S605, the same processes as those of S201 to S203 described above are performed. At this time, the processes of S603 and the following steps may be performed on only pixels in an area corresponding to the background in the background mask D601 or the process of S603 may be performed on all the pixels. Or, the positions of the detected point light sources and the background mask D601 are compared with each other and the processes of S604 and S605 may be performed on an area corresponding to the background. In S605, for example, if the addition area 503 overlaps the main object area, an addition process may be performed on only an area where the addition area 503 does not overlap the main object area. The pixels in the main object area may be excluded from the pixels from which the additional pixel values are calculated.

After the process of S605 is performed, the extracted main object is restored, so that it is possible to obtain an image in which the main object is focused and the blurring process is performed on the background.

As described above, in the present embodiment, when blurring the light source area, the light source area is blurred so that the luminance near the circumference is higher (image near the circumference is brighter) than that near the center, so that it is possible to reproduce the feeling of an image that is captured through an actual lens by using digital image processing.

Second Embodiment

When an image is captured by a digital camera using a lens, if the center of the angle of view is focused and the background is blurred as described above, the farther the ball blur is away from the center of the angle of view, the flatter the shape of the ball blur is due to the optical characteristics of the lens. In the second embodiment, a process will be described, in which the shape of an area blurred when the process of the first embodiment is performed is changed to a shape according to the position of the blurred area considering the optical characteristics of the lens.

Figure 7A:
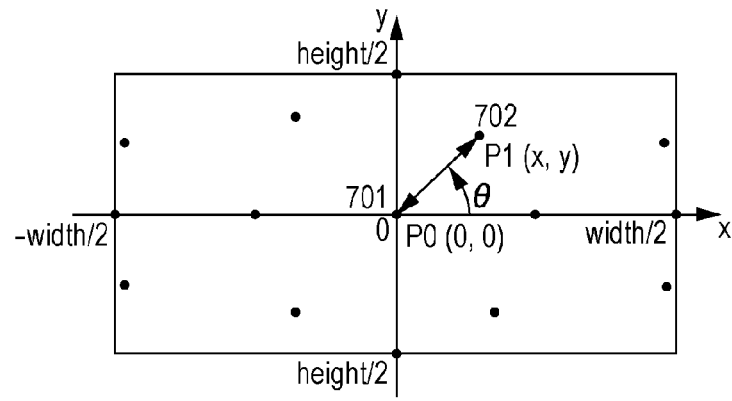
FIGS. 7A to 7D are diagrams showing an example in which the shape of a point light source blur is changed according to the position of the point light source.

FIG. 7A shows the entire area of the image data to be processed. In FIG. 7A, for illustrative purposes, the origin 701 is at the center of the image represented by the image data, the y axis is passing through the origin in the vertical direction, and the x axis is passing through the origin in the horizontal direction. The image represented by the image data is shown by the height and the width and the image data to be processed includes height x width pixels. Each pixel is represented as follows.

$$p(x,y)\{|x|-\text{width} \leq x < \text{width}, |y|-\text{height}/2 \leq y \leq \text{height}/2\} \quad \text{(Formula 10)}$$

In the present embodiment, it is assumed that the image of the image data to be processed is a horizontally long rectangle where height<width.

The black dots in FIG. 7A indicate the pixels of the point light sources detected in S201. FIG. 7A shows a state in which a plurality of points including P0(0, 0) 701 and P1(x, y) 702 are detected as the point light sources.

A plurality of blur masks having different shapes are properly used depending on how far the position of the detected point light source is away from the origin in the entire image. Specifically, the blur mask near the origin has a shape of almost perfect circle, and the farther the blur mask is away from the origin, the flatter the elliptical shape of the blur mask is. Here, the blur mask corresponds to the addition area 503 shown in FIG. 5. The blur mask is an area to obtain a blurred image of the point light source by performing the blurring process inside the mask.

Figure 7B:
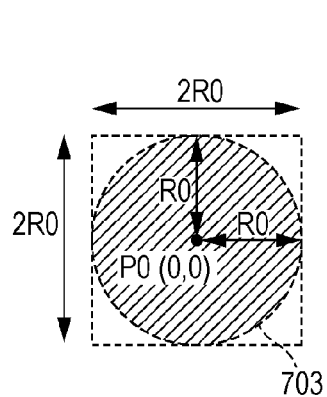

In a blurring correction of P0(0, 0) 701, a blur mask area 703 shown in FIG. 7B is used. A correction area having the size of 2R0 is set around P0(0, 0) 701. Pixels located within a range of the radius R0 from P0(0, 0) 701 are to be corrected. In the present embodiment, the shape of the mask area 703 at the center of the image is assumed to be a circle. An appropriate value can be set to R0 as an initial value. The greater the value is, the larger the degree of blur is. In the present embodiment, R0 has a fixed value of 5% of the width of the image. R0 may be varied by selection of the user. In this case, there is an effect that the user can select the correction effect.

Figure 7C:
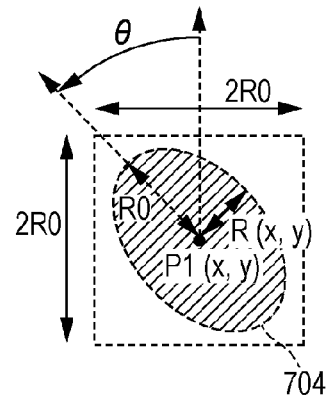
Figure 7D:
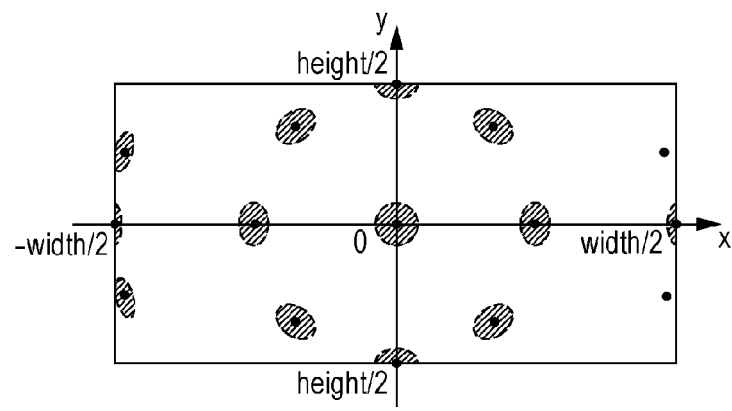

In the blurring correction of P1(x, y) 702 located a predetermined distance away from the origin, a blur mask area 704 shown in FIG. 7C is used. The blur mask area shown in FIG. 7C varies depending on the coordinates of P1(x, y) 702. The control of the variation will be described below. The blur mask area 704 is an ellipse which has a long side of R0 and a short side of R(x, y) and which is rotated by θ°. Here, R(x, y) is defined as follows.

$$R(x,y) = R0 \times (\text{width} - (l/2))/\text{width} \quad \text{(Formula 11)}$$

$$\text{Here, } l = (x^2 + y^2)^{1/2} \quad \text{(Formula 12)}$$

θ: an angle (°) between a line connecting the center point P0(0, 0) 701 to P1(x, y) 702 and the x axis FIG. 7D shows the shapes of the blur masks defined as described above. The process described in the first embodiment is performed except that, as described above, the farther the addition area is away from the center, the more flattened the addition area is. As shown in FIG. 7D, the nearer to the center of the image that the addition area is, the more perfect the circle of the blur effect is obtained, and the nearer to the edge of the image the addition area is, the more flattened the shape of the blur effect is obtained. In other words, an area in which the blurring process is performed is changed depending on the position of the point light source in the angle of view, so that the reproducibility of an image captured through a lens is improved. Further, the flattening direction is rotated around the origin, so that the blurring state of the point light source can be more reliably reproduced according to the optical characteristics of the lens.

Third Embodiment

In the second embodiment, an example is described in which the flattening ratio and the rotation of the blur mask area are controlled according to the coordinates of the point light source. However, in an image actually captured by a digital camera or the like through a lens, the nearer to the edge of the image, the larger the blurred area is. This is because the farther away from the center of the lens, the larger the degree of the blur. Therefore, in the present embodiment, in addition to the control of the shape of the blur mask area according to the second embodiment, a control is added in which the nearer to the edge, the larger the size of the blur mask area is, so that a correction effect is obtained in which a blurred image actually captured using a lens is reproduced more accurately than that in the second embodiment.

In the description below, only the processes different from those of the second embodiment will be described. The other processes are the same as those of the first and the second embodiments.

In the second embodiment, in FIG. 7C, the short side R(x, y) of the ellipse varies as a function of the coordinates p(x, y). The long side R0 is fixed. In the third embodiment, the long side of the ellipse is defined as R'(x, y) and obtained as a function of the coordinates p(x, y). Thereby, it is controlled so that the blur mask area is enlarged at the edge of the image. Therefore, R'(x, y) is defined as follows.

$$R'(x,y) = R0 \times \cos h(Z) \quad \text{(Formula 13)}$$

$$\text{Here, } Z = l/(\text{width}) \times \pi/2, l = (x^2+y^2)^{1/2} \quad \text{(Formula 14)}$$

Figure 8A:
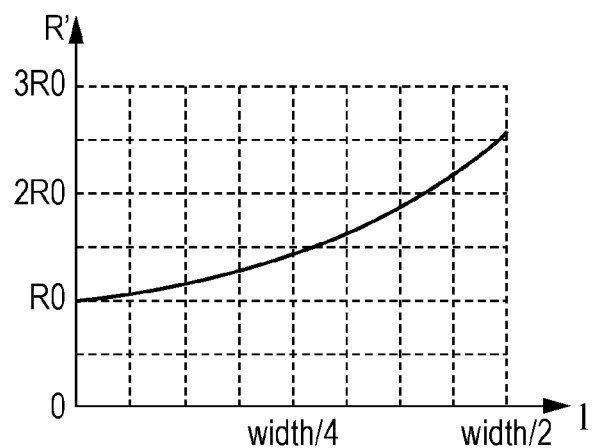
FIGS. 8A and 8B are diagrams showing an example in which the size of a point light source blur is changed according to the position of the point light source.

Thereby, as shown in FIG. 8A, R' forms a monotonically increasing convex-downward curve, and the nearer to the edge of the image, the larger the value of R'.

Figure 8B:
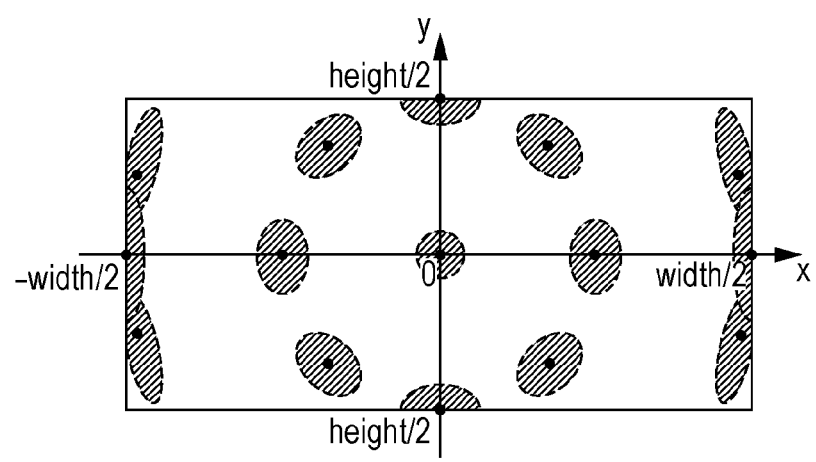

FIG. 8B shows the shapes of the blur masks defined as described above. As shown in FIG. 8B, a circular blur effect is obtained at the center. The nearer to the edge, the flatter the shape of the blur mask is. At the same time, while the flattening direction is rotated around the origin in the same manner as in the second embodiment, the nearer to the edge, the larger the blur mask area is. Thereby, it is possible to more faithfully reproduce the state of blur considering the optical characteristics of the lens than in the second embodiment.

Although a hyperbolic function $\cos h()$ is used as a function to control R', the function to be used is not particularly limited to this function. Any function which has the characteristics where the nearer to the edge, the greater the value may be used.

Although, in the third embodiment, a control for changing the size of the blur mask area is added to the control of the shape of the blur mask area of the second embodiment, it is possible to determine the blur mask area by a control for changing only the size (area) of the blur mask area without changing the shape of the blur mask.

Fourth Embodiment

In the above embodiments, the detection of a point light source (S201 and S603) is performed by extracting a target pixel having a luminance value higher than a predetermined threshold value and higher than that of the surrounding pixels by a predetermined value. In other word, a pixel (pixel group) which is significantly brighter than the surrounding pixels is detected as a point light source. However, there are various image capturing conditions in an image actually captured by a digital camera or the like, so that the point light source may have different features depending on the image capturing condition. In the present embodiment, a method for improving the accuracy of detecting the point light source will be described.

There may be various image capturing conditions. For example, there may be a difference of the brightness of the point light source between capturing a nightscape and capturing a landscape under daylight in clear weather. An image captured under cloudy condition with underexposure condition has low luminance values as a whole.

In the present embodiment, considering the above situations, the features of the image to be processed is analyzed, the image capturing condition of the image is estimated from the analyzed result, parameters used to detect the point light source are changed on the basis of the estimated result, and further the shape and the size of a point light source candidate are considered. The image capturing condition is estimated from the analyzed result of the features of the image. So, the image to be processed is not limited by the condition that an image is actually captured in and is further not limited to a captured image.

FIG. 9 is a flowchart showing the point light source detecting process (S201 and S603) according to the present embodiment.

In S901, the input image data Iin(x, y) (color image including pixels with RGB components) to be processed is resized to a predetermined size and resized image data Ire(x, y) is obtained. Here, x, y indicate a coordinate position on the image. When there are a plurality of sizes of the inputted image data (combinations of the height and the width of the image represented by the image data), it is necessary to determine the size of the point light source considering the size of the original image in the subsequent processes. Therefore, here, even when image data having any size is inputted, the image data is resized to a predetermined size, so that the same control parameters can be used in the subsequent processes. To resize the image data, pixels are interpolated or pixels are thinned out. Although the resized size is not particularly limited, for example, the image data is resized to a uniform size such as 1600×1200 pixels on the basis of the number of pixels. However, the inputted image data may be used in the subsequent processes without resizing the image data. Even when the image data is resized, the resized size need not be a uniform size. The resizing may be limited to a reducing process (thinning out) in order to reduce the amount of image data to be processed and the load of the processes. In the description below, a case in which the image data to be processed is resized to a predetermined size will be described. The image data to be processed is image data including pixels, each of which has multiple values.

In S902, an adaptive binarization process is performed on the resized image data to be processed. FIG. 10 is a flowchart showing details of the process in S902.

In S1001, luminance/color difference conversion is performed on each pixel of the inputted color image data. Although various types of luminance/color difference components can be employed, here, the image is converted into YCbCr components and the converted image is defined as Irey(x, y). A publicly known conversion method can be employed for this conversion.

Figure 11:
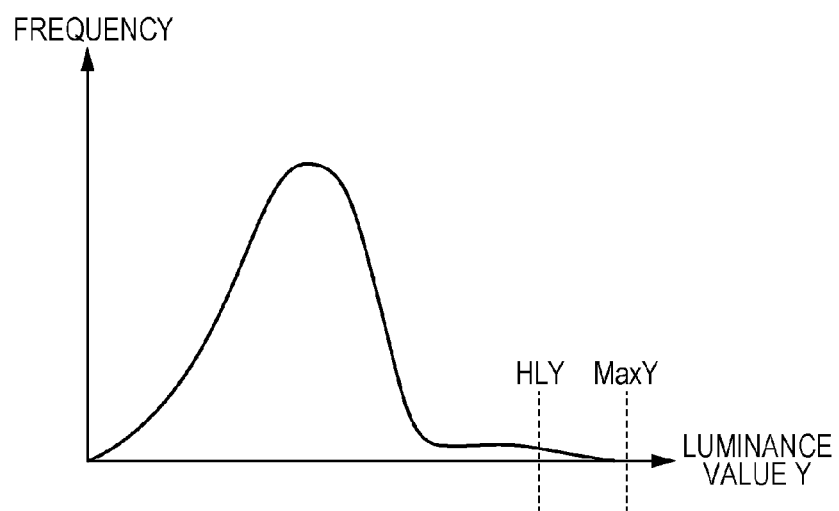
FIG. 11 is a histogram showing the number of pixels for each luminance value.

In S1002, a histogram of Y (luminance) component in Irey(x, y) is calculated. FIG. 11 is an example of the histogram calculated in S1002. The horizontal axis indicates the luminance value Y and the vertical axis indicates frequency (the number of pixels).

Next, in S1003, a highlight point is calculated. The highlight point is a high luminance point at which the cumulative frequency ratio reaches a predetermined ratio (for example, 97.0%). In FIG. 11, the highlight point is a point indicated by HLY. The maximum luminance value in the image data to be processed is a point indicated by MaxY in FIG. 11. The reason why the highlight point is obtained here is because there is a statistical view that areas of upper several percent and lower several percent in a frequency distribution are highly probable to be noise. Therefore, a point light source threshold value described later is determined based on HLY instead of MaxY. Thereby, in the image, an appropriate point light source is extracted while eliminating the influence of pixels having the maximum luminance, which may be noise.

Figure 12:
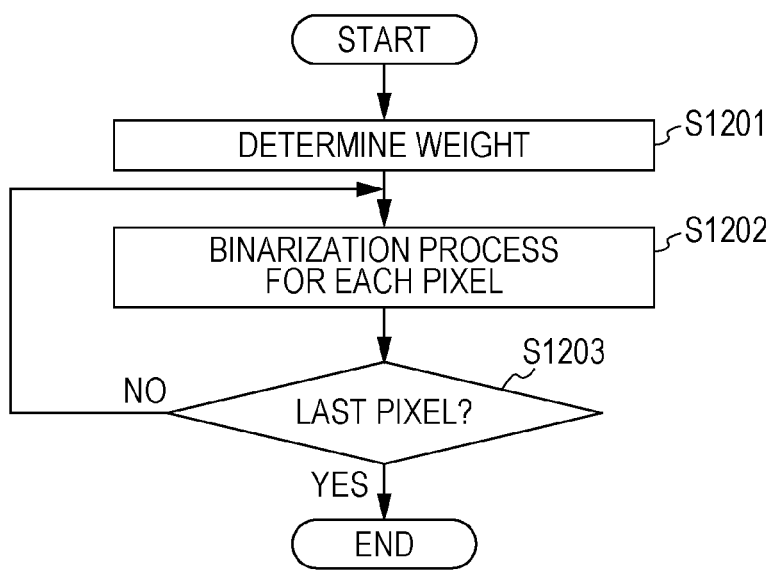
FIG. 12 is a flowchart showing a binarization process.

In S1004, a binarization process is sequentially performed on each pixel on Irey(x, y). FIG. 12 is a flowchart showing details of the binarization process in S1004. In S1201, weight W is determined. A luminance threshold value ThY for determining 0 or 1 when binarizing a pixel in the subsequent binarization process is determined by using the weight W and HLY as follows.

$$ThY = HLY \times W \quad \text{(Formula 15)}$$

The weight determined in S1201 is a predetermined value in the present embodiment. For example, the weight W is 0.9. When the weight W is determined, in S1202 and S1203, the binarization process is performed on each pixel of Irey(x, y) according to the conditions described below and binarized image data Ireb(x, y) is generated.

When $Y$ component of $Irey(x,y) \geq ThY, Ireb(x,y)=1$, and
when $Y$ component of $Irey(x,y) < ThY, Ireb(x,y)=0$ (Formula 16)

FIG. 13 shows the binarized image data Ireb(x, y) generated in the manner described above. In FIG. 13, reference numerals 1301 to 1304 denote areas of high luminance pixel groups (highlight areas). Here, as shown in FIG. 13, areas having various sizes and shapes are included.

The process returns to FIG. 9. In S903, clustering of the areas (1301 to 1304) located on the binarized image data Ireb(x, y) is performed. The clustering method of the areas is not particularly limited, and a publicly known method such as a labeling process may be used. Here, a border following method that can easily detect the size and the shape of an area with a small amount of calculation is used.

Figures 14A, 14B:
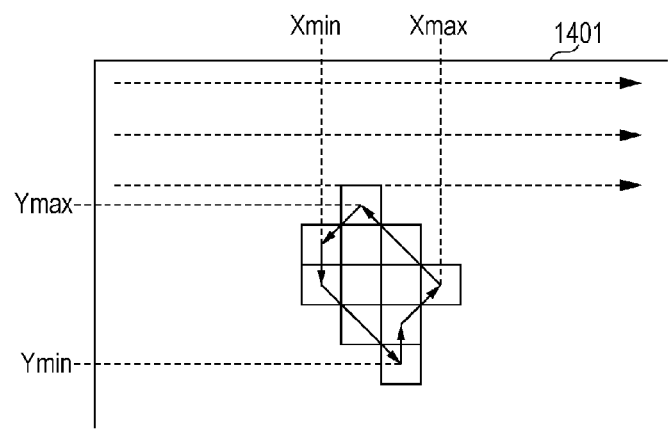
FIGS. 14A and 14B are diagrams for explaining a clustering process by a border following method.

FIGS. 14A and 14B are diagrams for explaining the clustering by the border following method. In FIG. 14A, reference numeral 1401 denotes a part of the binarized image data Ireb(x, y). In the border following method of the present embodiment, first, the binarized image data is sequentially scanned from upper left to lower right and the scanning temporarily stops at a pixel having a value of 1 in Ireb(x, y). Thereafter, pixels located on the border of the area are sequentially searched in the counterclockwise direction (or in the clockwise direction). When the search returns to the pixel at which the scanning temporarily stops, the search of one area is completed. While the border of the one area is followed, the maximum and the minimum coordinate positions (Xmin, Xmax, Ymin, and Ymax) and the perimeter Larr of the area are calculated. When the maximum and the minimum coordinate positions are obtained, the center position of the area (Cx, Cy) can be obtained as follows.

$$Cx=(X\max+X\min)/2, Cy=(Y\max+Y\min)/2 \quad \text{(Formula 17)}$$

When the search for one area is completed, the CPU 100 stores information indicating the result of the search and restarts the scan in the horizontal direction to perform the search for the next area. FIG. 14B shows a state in which the information obtained as a result of this process is associated with IDs assigned in the search order of the areas and stored. Although, here, the information is shown by symbols, actually the coordinates and the lengths are stored using numerical values.

Figure 15:
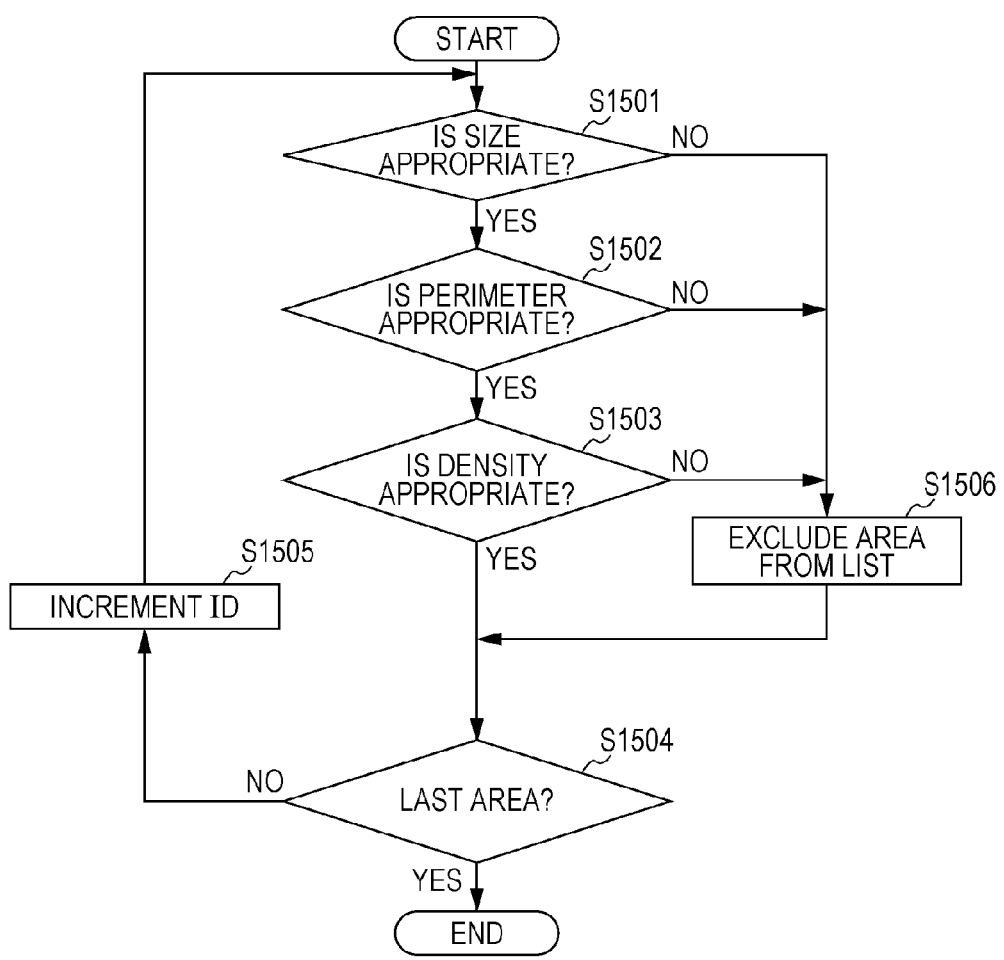
FIG. 15 is a flowchart showing a process for detecting point light sources.

In S904, the point light source is extracted (specified) by using clustering information such as the area ID and the area coordinate information shown in FIG. 14B. FIG. 15 is a flowchart showing the process for extracting the point light source (specifying the position of the point light source) in S904.

First, in S1501, it is determined whether the size of the area of ID=0 is appropriate or not. The determination is performed according to the formula below.

$$(X\max\text{ID}-X\min\text{ID})\leq Th\text{Size and }(Y\max\text{ID}-Y\min\text{ID})\leq Th\text{Size} \quad \text{(Formula 18)}$$

In the above formula, ThSize is a predetermined threshold value indicating the upper limit of the size of the point light source. ThSize is determined in advance.

If it is determined that the above formula is satisfied, the process proceeds to S1502 and it is determined whether the perimeter of the area is appropriate or not (whether or not the perimeter is long enough for the area to be a point light source). The determination is performed according to the formula below.

$$\text{abs}(Larr\text{ID}-Lrect\text{ID}\times K)\leq Th\text{ArrL} \quad \text{(Formula 19)}$$

In the above formula, abs( ) is a function to obtain an absolute value. LrectID and K are obtained according to the formulas below.

$$Lrect\text{ID}=((X\max\text{ID}-X\min\text{ID})+(Y\max\text{ID}-Y\min\text{ID}))\times 2 \quad \text{(Formula 20)}$$

$$K=\pi/4\approx 0.785 \quad \text{(Formula 21)}$$

In the above formulas, LrectID is the perimeter of a rectangle enclosing the target area. When multiplying the LrectID by the K, an approximate perimeter of a circle or an ellipse inscribed in the rectangle can be obtained. The absolute difference between this perimeter and the perimeter LarrID actually measured in the border following process is greater than the predetermined threshold value ThArrL, it is highly possible that the shape of the point light source candidate is not a circle or an ellipse but has a more complicated shape. Therefore, the area is excluded from a point light source list.

For the area determined to have an appropriate perimeter in S1502 by the process described above, the process proceeds to S1503 and the density of the area is determined.

In S1503, the number of pixels whose value is 1 on the Ireb(x, y) in a rectangular area represented by the coordinates (Xmin, Ymin)–(Xmax, Ymax) is counted. When the count number is NumID, the density determination in S1503 is performed according to the formula below.

$$\text{abs}(\text{NumID}-Sid)\leq Th\text{Num} \quad \text{(Formula 22)}$$

In the above formula, Sid is the area of the rectangular area. Sid is obtained by the following formula.

$$Sid=(X\max\text{ID}-X\min\text{ID})\times(Y\max\text{ID}-Y\min\text{ID}) \quad \text{(Formula 23)}$$

In Formula 22, ThNum is a predetermined threshold value. If the difference between the area of the rectangle and the pixel density is greater than or equal to ThNum, it is highly possible that the area is not a circular area and the area has another shape, so that the area is excluded from the point light source list.

The area ID is incremented in S1505 until the area is determined to be the final area in S1504, so that the processes from S1501 to S1503 described above are applied to all the point light source candidates. Thereby, in FIG. 13, the area 1302 which is too large to be a point light source, the area 1303 which has a complicated shape, the area 1304 whose density is low (whose shape is too distorted) are excluded from the point light sources. By doing so, it is possible to extract (specify) the areas 1301, which are highly likely to be point light sources, from the point light source candidates shown in FIG. 13.

After the blurring process in S202 of FIG. 2 or in S604 of FIG. 6 is performed, the coordinate list of the point light source areas 1301 extracted here are inputted into the point light source blurring process in S203 of FIG. 2 or in S605 of FIG. 6 and the point light source processing as described above is performed. The processes other than the above may be the same as those in the embodiments described above. However, when the resizing in S901 is performed, the processes of S202 and the following steps or the processes of S604 and the following steps are performed after the image is restored to the original image size, or the image is finally restored to the original image size after the processes of S202 and the following steps or the processes of S604 and the following steps are performed by using the resized image.

According to the present embodiment, the point light source area is determined by changing the luminance level to recognize a point light source candidate according to the luminance distribution of the image data to be processed. In other words, a determination criteria of the point light source area is changed according to the features of the image data to be processed, so that the point light source can be appropriately detected according to the image capturing conditions of the image to be processed. Further, the point light source area is determined from the point light source candidate areas on the basis of the shape and the size of the area, so that it is possible to improve the accuracy of determining the point light source area. Even when only one of the processes for specifying the point light source candidate according to the luminance distribution and specifying the point light source candidate on the basis of the shape and the size of the point light source area is performed, a sufficient effect can be expected.

Fifth Embodiment

For example, when an image of nightscape is processed, illumination of various colors may be a point light source. When extracting such various light sources as point light sources, if a binarization threshold value for listing the point light source candidates is a fixed threshold value as in the fourth embodiment, only yellowish point light sources are extracted and bluish point light sources are difficult to be extracted. Therefore, in the present embodiment, the threshold value used for the adaptive binarization process in the fourth embodiment is varied according to the color of each pixel so that point light sources of various colors can be appropriately extracted (determined).

Figure 16A:
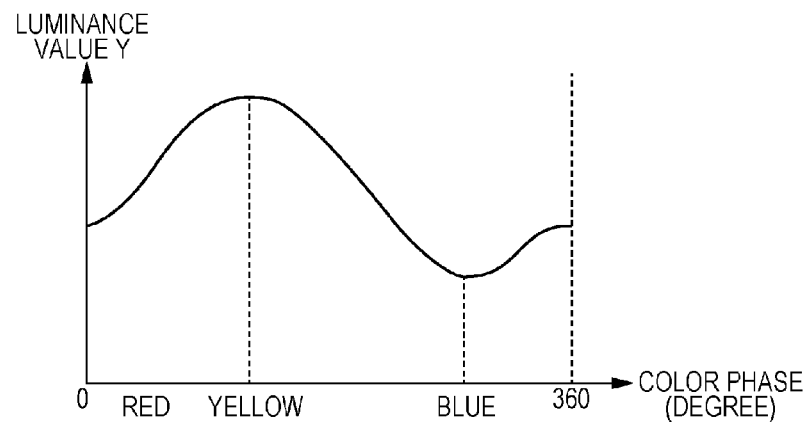
FIGS. 16A and 16B are diagrams for explaining a weight according to a color phase.
Figure 16B:
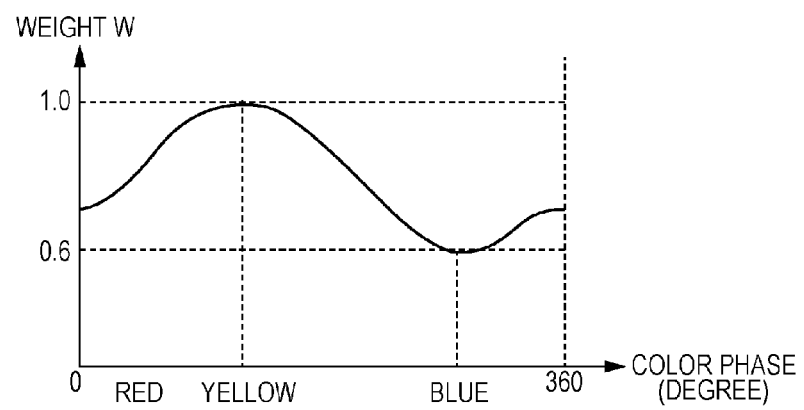

FIG. 16A is a diagram showing a relationship between the color phase and the luminance value. In FIG. 16A, the horizontal axis indicates the color phase. It is indicated that that the color phase near 0 degree is red and the color phase varies from there to yellow, green, and blue. In FIG. 16A, the vertical axis indicates the luminance value Y. As shown in FIG. 16A, the luminance value is highest near the yellow and lowest near the blue. In the present embodiment, considering this relationship, the threshold value for the adaptive binarization process is determined for each color. Specifically, as shown in FIG. 16B, the weight W is varied according to the relationship between the color phase and the luminance value in FIG. 16A, and a value obtained by multiplying the threshold value in the fourth embodiment by the weight W according to FIG. 16B for each color shown by the target pixel is used as a threshold value for the binarization. The values indicating the relationship between the color phase and the luminance value shown in FIG. 16A are stored in the HD 103 as a table. The intervals between the color phases when the values are converted into the table are appropriately determined based on the gradation or the like of the image to be processed or the intervals are set to a fixed value. As shown in FIG. 16B, the weight W is set to a large value near the yellow and set to a small value near the blue, so that the difference of the original luminance values of each color is absorbed and both colors can be equally extracted as a point light source.

Figure 17:
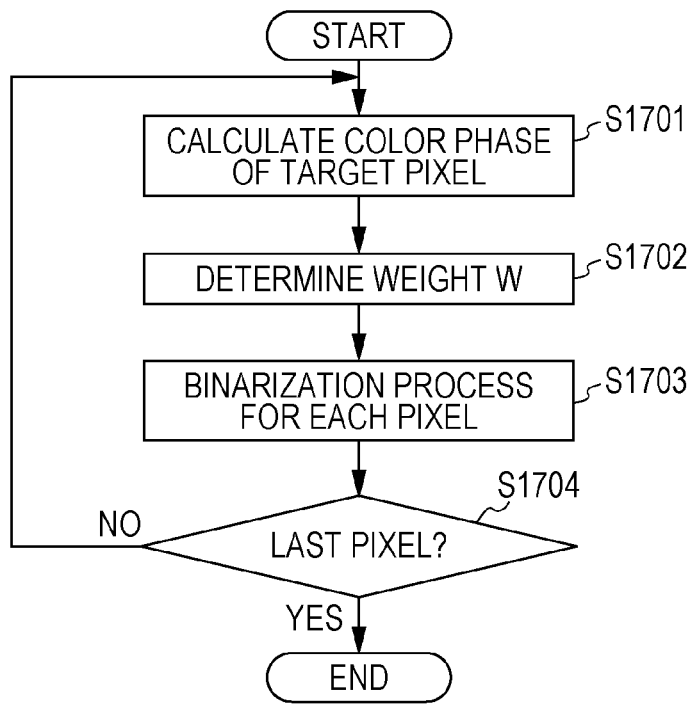
FIG. 17 is a flowchart showing a binarization process.

FIG. 17 is a flowchart showing the binarization process in the adaptive binarization process according to the present embodiment. This flowchart shows the process performed in S1004 in FIG. 10.

In S1701, the color phase of the target pixel Ire(x, y) to be processed this time in the image data to be processed is calculated. In this calculation, a publicly known arithmetic expression may be used. In S1702, a table corresponding to FIG. 16B is referred to and a weight W corresponding to the color phase of the target pixel is determined on the basis of the reference result.

In S1703, the binarization process is performed according to Formula 16. The processes from S1701 to S1703 are repeatedly performed until the binarization process is performed on all the pixels to be processed. The processes other than the above are the same as those described in the fourth embodiment, so that the descriptions thereof are omitted.

As described above, according to the present embodiment, it is possible to appropriately specify point light sources even from an image including point light sources of various colors, such as an image of nightscape.

Sixth Embodiment

Images captured by a digital camera may include images captured under various environments. For example, the images may include a landscape captured under daylight in clear weather, a nightscape including glittering neon lights, and an image captured under cloudy condition with underexposure condition. Therefore, the features of the point light sources may vary under various image capturing environments, so that if the image is binarized according to a fixed threshold value as in the fourth embodiment, the point light sources may not be appropriately determined.

In the present embodiment, in the adaptive binarization process in the fourth embodiment, the threshold value of the binarization process is varied according to the features of the images corresponding to the various image capturing environments, so that it is possible to appropriately specify the point light sources. In the present embodiment, when performing the process of S902 in FIG. 9, the image capturing scene of the image to be processed is determined and the weight W is determined so that the threshold value of the binarization process varies according to the determination result of the image capturing scene.

FIG. 18A shows a luminance histogram of a typical sample of an image captured under daylight in clear weather. FIG. 18B shows a luminance histogram of a typical sample of an image captured as a nightscape. In these histograms, in the same manner as in the fourth embodiment, the position at which the cumulative frequency ratio reaches a predetermined ratio (for example, 97.0%) is defined as HLY. The light quantity is sufficient when an image is captured under daylight, so that when extracting a point light source on the basis of HLY, it is highly likely that the contrast of the image is appropriate, and thus the detected HLY may be used without change. On the other hand, in the case of the nightscape as shown in FIG. 18B, if HLY that is specified at a fixed ratio is used as the threshold value, the luminance value at the position of HLY is higher than a threshold value HLY_2 of the point light source that is desired to be extracted, so that it is likely that only a part of point light sources actually located in the image are detected. In view of the above situation, when the binarization threshold value for extracting the point light source is adaptively controlled, it is possible to perform more appropriate point light source extraction process. Therefore, in the present embodiment, as shown in FIG. 18C, the weight W is varied according to the luminance distribution for each image capturing scene. Here, a case in which the image capturing scene is classified into three types is illustrated. These weights W are associated with the image capturing scenes and stored in the HD 103. These weights W satisfy the following relationship.

Landscape>nightscape>underexposure (Formula 24)

Although, here, three patterns are illustrated as the image capturing scenes, it is not limited to this, and various image capturing scenes can be employed.

Figure 19:
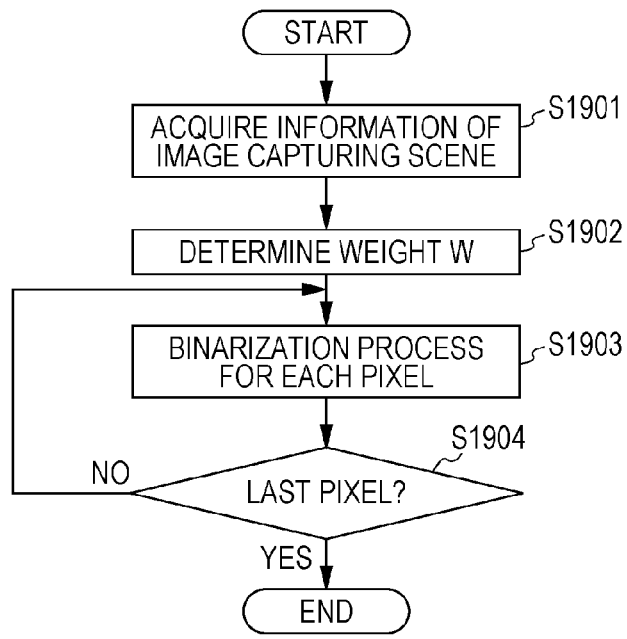
FIG. 19 is a flowchart showing a binarization process.

FIG. 19 is a flowchart showing the binarization process in the adaptive binarization process according to the present embodiment. This flowchart shows the process performed in S1004 in FIG. 10.

First, in S1901, information of the capturing scene of the image to be processed is acquired. The image capturing scene may be acquired from image capturing information attached to the inputted image data or may be estimated by analyzing the feature value of the image. In the former case, for example, if the image data is an image file conforming to the standards of Exif (Exchangeable Image File Format), the image capturing information when the image is captured by a digital camera can be written to the image file as a tag. Therefore, the information may be read and acquired from the image file. In the latter case, for example, methods disclosed in Japanese Patent Laid-Open No. 2011-10162, Japanese Patent Laid-Open No. 2010-273144, and Japanese Patent Laid-Open No. 2010-251999 may be used. Specifically, in order to estimate the image capturing scene, a plurality of types of feature values are calculated from the image to be processed and a feature vector is formed. Then, the feature vector is compared with databases learned and stored for each of various scenes and in what scene the input image is captured is estimated. In S1901, the image capturing scene only has to be estimated, so that the generation of the histogram may be omitted.

In S1902, the weight W is determined according to the acquired image capturing scene, and in S1903, the binarization process is performed according to Formula 16 using the weight W. The binarization process is sequentially performed on all the pixels until the last pixel is detected in S1904.

As described above, according to the present embodiment, the threshold value is set according to the features of the image based on the image capturing scene and then the point light source is detected, so that it is possible to appropriately detect the point light source according to the image capturing scene. At this time, the threshold value is determined by specifying the image capturing scene, so that the processing load is not so high.

Although, in the above example, a method for varying the weight W is described as an example of parameter control for extracting the point light source according to the image capturing scene, other methods can also be employed. For example, when the cumulative frequency ratio indicated by HLY is adjusted for each image capturing scene and the adjusted cumulative frequency ratio is used as the threshold value, the same effect can be obtained. Or, methods other than the above may be employed.

Seventh Embodiment

In the sixth embodiment, an example is described in which the information of the image capturing scene of the image to be processed is specified and the information is reflected on a parameter used to detect the point light source. When an image is captured by a digital camera or the like, the image can be captured by changing the image capturing sensitivity (ISO film speed). The ISO speed may have a value from 50 to several tens of thousands. The higher the value, the higher the sensor sensitivity at which the image is captured. If the image capturing sensitivity is high, the luminance value is very high even when the light quantity is small, so that the threshold value of the binarization for detecting the point light source should be high. If the image capturing sensitivity is low, it is equivalent to a state in which the entire light quantity is low, so that the binarization threshold value should be set to low.

Therefore, in the present embodiment, when the image to be processed is an image captured by a digital camera or the like, information of the ISO speed when the image is captured is acquired and the threshold value for the adaptive binarization process for detecting the point light source is changed according to the information of the ISO speed. Thereby, the point light source can be appropriately detected.

Figure 20:
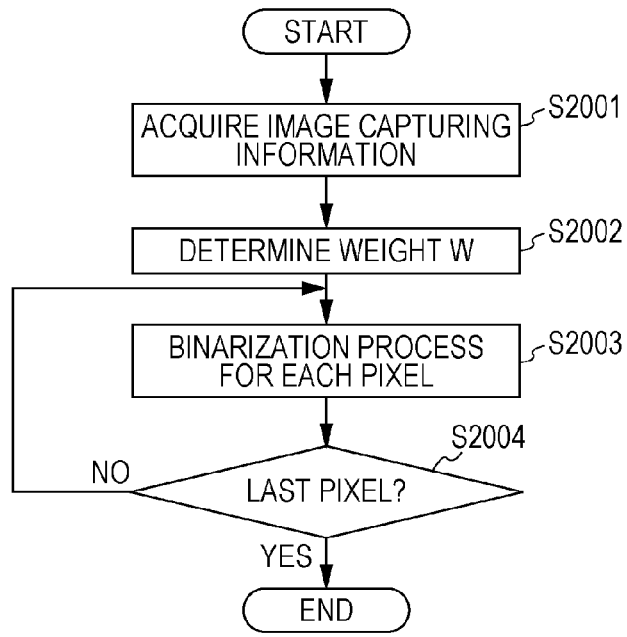
FIG. 20 is a flowchart showing a binarization process.

FIG. 20 is a flowchart showing the binarization process in the adaptive binarization process according to the present embodiment. This flowchart shows the process performed in S1004 in FIG. 10.

In S2001, the image capturing information is acquired from the image data to be processed. If the image data to be processed conforms to the standards of Exif, the image data may include a tag to which ISO Speed Rate is written as the image capturing sensitivity information. Here, the value of the ISO Speed Rate is acquired.

Next, in S2002, the weight W according to the acquired ISO speed is determined. The weight according to the present embodiment is determined as described below.

Figure 21:
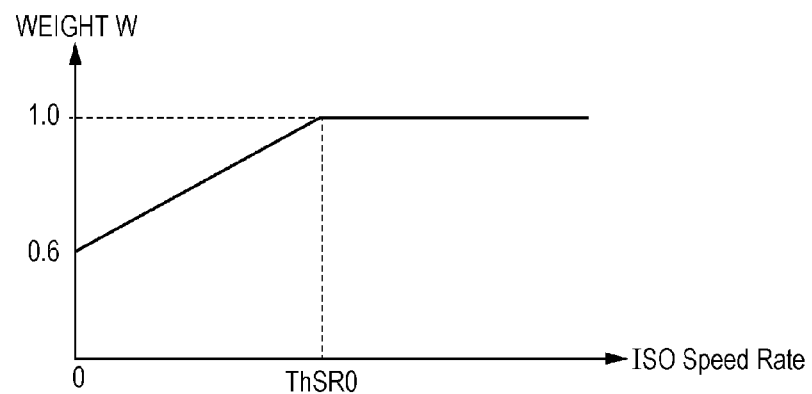
FIG. 21 is a diagram for explaining a weight according to ISO Speed Ratings.

FIG. 21 is a diagram showing a relationship between the value of the ISO speed (ISO Speed Rate) and the weight W corresponding to the ISO speed. As shown in FIG. 21, when the ISO speed is lower than a predetermined value ThSR0, as the ISO speed increases, the weight W also increases and the weight W reaches 1.0 at ThSR0. Data indicating this relationship is converted into a table and stored in the HD 103. In S2002, the weight W corresponding to the image capturing information acquired in S2001 is determined by referring to the table. In S2003, the binarization process is performed according to Formula 16 using the weight W. The binarization process is sequentially performed on all the pixels until the last pixel is detected in S2004.

As described above, according to the present embodiment, it is possible to appropriately detect the point light source according to the image capturing sensitivity when the image to be processed is captured. In this case, the information attached to the image file to be processed is used, so that the processing load is not high.

Although, in the above example, a method for varying the weight W is described as an example of parameter control for extracting the point light source according to the image capturing sensitivity, other methods can also be employed. For example, when the cumulative frequency ratio indicated by HLY is adjusted according to the image capturing sensitivity and the adjusted cumulative frequency ratio is used as the threshold value, the same effect can be obtained. Or, methods other than the above may be employed.

Eighth Embodiment

When an image is captured by a digital camera or the like, in order to adjust the light quantity reaching a sensor, the aperture may be adjusted manually or automatically. The degree of aperture is represented as F-number.

The smaller the value of F-number, the more open the aperture is. In this case, the captured image is in a state in which the depth of field is shallow. When the depth of field is shallow, only the main object is focused when the image is captured and the background is blurred, so that the point light source is also largely blurred according to the shape of the aperture. On the other hand, when the F-number is large, the captured image is in a state in which the depth of field is deep. When the depth of field is deep, a wide range from the main object when the image is captured to the background is focused, so that the point light source in the background is still small.

Therefore, in the present embodiment, considering that the size of the point light source in the background varies according to the state of the aperture when the image is captured, the state of the aperture is reflected on the determination of the size in S1501 in FIG. 15. In the present embodiment, the size threshold value ThSize for determining the point light source candidate in S1501 is changed according to the F-number.

Figure 22:
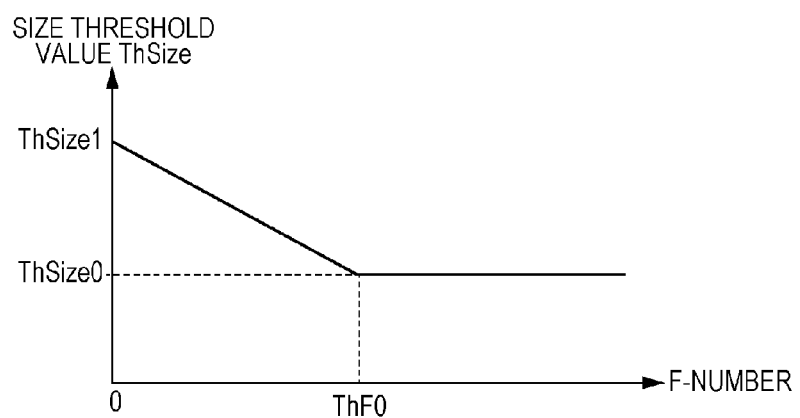
FIG. 22 is a diagram for explaining a size threshold value according to F-number.

FIG. 22 is a diagram showing a relationship between the F-number and the size threshold value ThSize. When the F-number is smaller than ThF0, that is, when the depth of field is shallow, the threshold value is increased, and as the F-number increases, the threshold value decreases. When the F-number is larger than ThF0, the depth of field is sufficiently deep, so that the threshold value is set to a constant value.

As described in the sixth and the seventh embodiments, image data conforming to the standards of Exif may include a tag to which the F-number is written. Therefore, the size threshold value ThSize is specified according to the F-number that is determined by referring to the F-number attached to the image data to be processed, and the process of FIG. 15 is performed.

In this way, the depth of field is estimated by referring to the F-number and the size of the point light source located in the background is adaptively determined, so that it is possible to appropriately specify the point light source even when the state of the depth of field changes.

The processes of the embodiments described above may be properly combined or a part of the processes may be changed. The embodiments described above may be performed by not only a PC, but also a digital camera and a printer. In this case, the digital camera and the printer function as the image processing apparatus. Although, when the embodiments are performed by a printer, it is possible to print an image on which the above processes are performed onto a recording medium, the above processes may be performed on image data in which the image data is converted into color density data.

By the embodiments as described above, it is possible to appropriately specify the point light source and appropriately perform the blurring process of the determined point light source.

The embodiments are also realized by performing the process below. That is, a process in which software (program) realizing the functions of the above embodiments is provided to a system or an apparatus via a network or various non-transitory storage media and a computer (CPU, MPU, or the like) of the system or the apparatus reads and executes the program. The program may be executed on one computer or may be executed by a plurality of computers in conjunction with each other. It is not necessary to realize all the processes by software, but part or all of the processes may be realized by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161443 filed Jul. 23, 2011, which is hereby incorporated by reference herein in its entirety.

What is claimed is:

1. An image processing apparatus comprising:
an input unit configured to input image data;
a specifying unit configured to specify an area corresponding to local light in an image represented by the image data inputted by the input unit; and
a processing unit configured to perform a blurring process on a blurring area based on the specified area,
wherein the processing unit performs brighten process on at least a part of the blurring area so that a surrounding portion in the blurring area and at an outer side of a center portion the blurring area is brighter than the center portion, and
wherein at least one processor of the image processing apparatus is configured to perform at least one of the input unit, the specifying unit, and the processing unit.

2. The image processing apparatus according to claim 1, wherein the blurring area includes the specified area and an enclosing area surrounding the specified area.

3. The image processing apparatus according to claim 2, further comprising:
a setting unit configured to set the enclosing area in the image represented by the image data inputted by the input unit,
wherein the at least one processor is further configured to perform the setting unit.

4. The image processing apparatus according to claim 3, wherein the setting unit changes an area set as the enclosing area of the specified area according to a position of the specified area.

5. The image processing apparatus according to claim 1, wherein the processing unit performs the brighten process on the at least a part of the blurring area by adding a predetermined luminance value to each pixel included in the at least a part of the blurring area.

6. The image processing apparatus according to claim 5, wherein the predetermined luminance value is a value obtained by multiplying an additional luminance value, calculated on the basis of an average luminance value of the pixels included in the specified area or a luminance value of a pixel corresponding to a center point of the specified area, by an addition coefficient.

7. The image processing apparatus according to claim 6, wherein the addition coefficient is determined according to a distance from the pixel corresponding to the center point to a pixel to which the predetermined luminance value is to be added.

8. The image processing apparatus according to claim 5, wherein
the predetermined luminance value is a value varied based on a size of the enclosing area.

9. The image processing apparatus according to claim 5, wherein the predetermined luminance value is a value varied based on a distance from a pixel corresponding to a center point of the specified area to a pixel to which the predetermined luminance value is to be added.

10. The image processing apparatus according to claim 1, wherein the processing unit performs the brighten process on the at least a part of the blurring area by changing a pixel value of each color component of each pixel included in the at least a part of the blurring area.

11. The image processing apparatus according to claim 10, wherein the pixel value of each color component is a value obtained by multiplying an additional pixel value, calculated on the basis of an average pixel value of the pixels included in the specified area or a pixel value of a center point of the specified area, by an addition coefficient.

12. The image processing apparatus according to claim 11, wherein the addition coefficient is determined according to a distance from the pixel corresponding to the center point to a pixel of which a pixel value of each color components is to be changed.

13. The image processing apparatus according to claim 1, wherein the processing unit performs the blurring process modeled on a diffraction phenomenon which occurs when an image is captured through a lens.

14. The image processing apparatus according to claim 1, further comprising a second processing unit of the image processing apparatus configured to perform a blurring process on an area obtained by removing the specified area from the background area, wherein the at least one processor is further configured to control the second processing unit.

15. The image processing apparatus according to claim 1, wherein that performs the brighten process on the surrounding portion so that the surrounding portion is brighter than the center portion.

16. The image processing apparatus according to claim 1, wherein the specifying unit specifies the area corresponding to local light based on a luminance threshold used for detecting of local light candidate areas in the image represented by the image data inputted by the input unit.

17. The image processing apparatus according to claim 1, wherein the specifying unit specifies the area corresponding to local light based on a size threshold used for detecting of the area corresponding to local light from local light candidate areas in the image represented by the image data inputted by the input unit.

18. An image processing method comprising:

specifying an area corresponding to local light in an image represented by inputted image data; and performing a brighten process on at least a part of a blurring area based on the specified area so that a surrounding portion in the blurring area and at an outer side of a center portion of the blurring area is brighter than the center portion.

19. A non-transitory computer readable medium comprising a program configured to perform the method according to claim 18 by an apparatus.

\* \* \* \* \*